United States Patent
Muthurajan et al.

(10) Patent No.: US 10,242,199 B2
(45) Date of Patent: Mar. 26, 2019

(54) APPLICATION TEST USING ATTACK SUGGESTIONS

(71) Applicant: HEWLETT PACKARD ENTERPRISE DEVELOPMENT LP, Houston, TX (US)

(72) Inventors: Sasi Siddharth Muthurajan, Cambridge, MA (US); Matias Madou, Diegem (BE); Prajakta Jagdale, Sunnyvale, CA (US); Jeremy Brooks, Alpharetta, GA (US)

(73) Assignee: EntiT Software, LLC, Sanford, NC (US)

( * ) Notice: Subject to any disclaimer, the term of this patent is extended or adjusted under 35 U.S.C. 154(b) by 91 days.

(21) Appl. No.: 15/031,454

(22) PCT Filed: Jan. 31, 2014

(86) PCT No.: PCT/US2014/014034
§ 371 (c)(1),
(2) Date: Apr. 22, 2016

(87) PCT Pub. No.: WO2015/116138
PCT Pub. Date: Aug. 6, 2015

(65) Prior Publication Data
US 2016/0267277 A1    Sep. 15, 2016

(51) Int. Cl.
*G06F 21/57* (2013.01)
*H04L 29/06* (2006.01)

(52) U.S. Cl.
CPC ...... *G06F 21/577* (2013.01); *G06F 2221/033* (2013.01)

(58) Field of Classification Search
CPC ..... H04L 63/14; G06F 21/577; G06F 2221/03
See application file for complete search history.

(56) References Cited

U.S. PATENT DOCUMENTS

| | | | |
|---|---|---|---|
| 2003/0233581 A1* | 12/2003 | Reshef | G06F 21/554 726/25 |
| 2008/0120722 A1* | 5/2008 | Sima | H04L 63/1433 726/25 |
| 2014/0373158 A1* | 12/2014 | Hay | G06F 21/577 726/25 |
| 2015/0161386 A1* | 6/2015 | Gupta | G06F 11/3612 726/23 |

* cited by examiner

*Primary Examiner* — Izunna Okeke

(57) ABSTRACT

Example embodiments disclosed herein relate to a security test. A crawl of an application under test (AUT) is performed to determine an attack surface using crawl sessions. One or more parameters of the attack surface are probed during the respective crawl sessions. A trace is requested from an observer for the probe of the one or more parameters. Attack suggestions are received from the observer based on the trace of the one or more parameters.

18 Claims, 4 Drawing Sheets

APPLICATION TEST USING ATTACK SUGGESTIONS

BACKGROUND

Software security testing is used to identify vulnerabilities in an application such as a Web application. Traditional black-box security testing for Web-based software works by using a security testing application, often referred to as a scanner, which poses as an attacker. In a black-box approach, the scanner explores an Application Under Test (AUT) by making Hypertext Transfer Protocol (HTTP) requests and evaluating the HTTP responses in order to find all of the URLs where the AUT accepts input. The URLs where the AUT accepts input may be referred to the attack surface of the AUT. The scanner then creates attacks based on the attack surface and likely categories of vulnerabilities. The scanner applies the attacks to diagnose the presence or absence of vulnerabilities by evaluating the program's HTTP responses.

BRIEF DESCRIPTION OF THE DRAWINGS

The following detailed description references the drawings, wherein.

DETAILED DESCRIPTION

Figure 1:
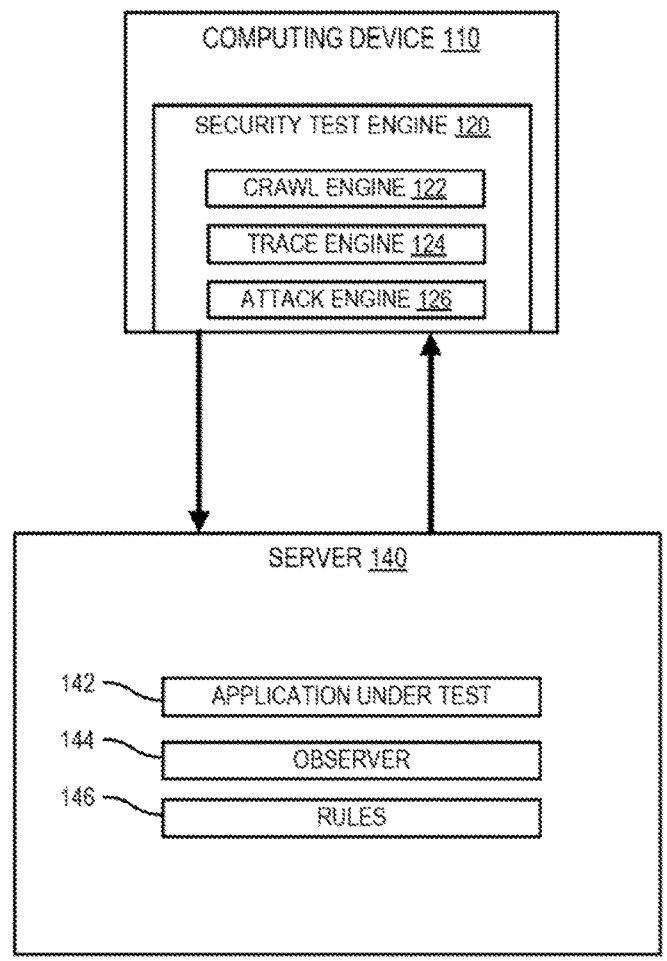
FIG. 1 is a block diagram of a computing system for performing a security test based on attack suggestions, according to one example.

A web application vulnerability scanner is an approach for identifying vulnerabilities in a web application. A scanner starts by crawling the application under test (AUT) to identify the attack surface. A runtime agent or observer can be installed on the application server to assist with identifying the attack surface more accurately. As described herein, a software program referred to herein as an observer or runtime agent is used to watch the internal operations performed by the AUT. The observer enables the scanner to determine the operation of the AUT and how it behaves in response to attacks. The observer also enables the scanner to determine the behavior of the AUT in response to normal application requests, which the scanner may use to determine what types of attacks to send. The scanner continues to deliver attacks to the AUT, and the scanner receives knowledge of the internal workings of the AUT from the observer. In this way, the scanner can find more vulnerabilities and produce better vulnerability reports, thereby providing a more comprehensive and detailed software security test of web-based applications. However, sending out al attack vectors for the identified attack surface can be time-consuming due to various factors such as size of the web application, server response time, network lag, etc.

Accordingly, various embodiments herein use an observer to provide attack suggestions to reduce the amount of time used to attack the web application during testing. The observer installed on the application server has access to much information next to the attack surface. The approaches described herein solve the challenge of elongated scan times by confirming pieces of information that are known to the observer that will expose the important information to the vulnerability scanner. Bringing various pieces of information known to these components together can help to infer various kinds of application behavior. This can allow the observer to guide the scanner to precisely attack locations with a higher probability for vulnerability to exist.

One issue that is solved using the approaches described herein is the inability to decide whether to attack a particular input point. In order to avoid missing vulnerabilities, scanners may send multiple useless attacks to locations of the web applications that are definitely not vulnerable. The observer can be used to control and drive the attacks sent by the scanner. This is beneficial because the observer has more insight into the behavior of the application than the scanner. Based on this information, it is possible to be able to target specific attacks against specific input points within the application, thus allowing a similar quality scan to be executed much faster. Also, being able to avoid duplicate attacks against the same server-side execution paths provides cleaner and faster results.

In certain examples, an approach to implement the system is to introduce a probe phase between a crawl and an audit phase of a security test to make the attacks more targeted. During that phase, the observer works together with the scanner to create a list of possible vulnerabilities, and subsequently a list of attacks that need to be executed. In certain examples, when the attack suggestions are not used, each of the attacks are executed, which makes the overall scan time longer.

In accordance with various examples, a communication channel is provided between the observer and the scanner. The scanner uses this communication channel to get insight into the AUT during its scanning. The communication channel between the scanner and the observer may be implemented by using the communication channel already in use by the AUT. In this way, the person conducting the test does not have to perform additional configuration or setup work, and the communication channel does not interfere with the normal operation of the AUT or the computer system on which the AUT is running. Additional benefits of the present invention may be better understood with reference to the description provided below.

FIG. 1 is a block diagram of a computing system 100 for performing a security test based on attack suggestions, according to one example. Computing device 110 and server 140 include components that can be utilized to use attack suggestions to perform a security test. The respective devices 110, 140 may be a notebook computer, a desktop computer, a server, a workstation, or any other computing device capable of performing the recited functionality. In certain examples, a server is a system that can respond to requests over a computer network to provide or help provide a network service. In certain examples, the computing device 110 can include a security test engine 120, which may further include a crawl engine 122, a trace engine 124, and an attack engine 126. Further, the server 140 may include an application under test 142, an observer 144, and rules 146. Communications between the computing device 110 and the server 140 may be conducted using a request-response protocol such as the Hyper-Text Transfer Protocol (HTTP).

The security test engine 120 can perform security tests on the AUT, for example, a scan. At the start of a scan, the security test engine 120 can send a request to the observer 144 for a list of suggestions that it supports. The observer 144 can return the list of types/categories of suggestions supported. This list allows the security test engine 120 to mark the corresponding audit or attack engines 126 compatible with using the approaches described herein so that the security test engine 120 can later understand the communications sent by the observer 144. The suggestions list can be based on a set of rules 146 supported by the observer 144. In certain examples, audit or attack engines 126 are independent components within the scanner/security test engine 120 that are responsible for performing specific types of attacks. Following this, the security test engine 120 can perform a crawl phase, a probe phase, and an audit phase.

In the crawl phase, the crawl engine 122 crawls the AUT 142, which allows the security test engine 120 to be able to identify an attack surface. This can be done by fetching attack surface information from the server-side observer 144, following links, executing scripts, etc.

In some examples, in the probe phase, a trace engine 124 is the first audit engine to execute on each crawl session. A session is a term used to refer to a pair of request and response. A crawl session is a session that was created while crawling the AUT 142. The trace engine 124 can send a probe on each and/or every parameter of the crawl session, and can follow up each request with a corresponding trace request that will collect the suggestions that are specific to each probed parameter. It is also possible to send multiple probes at once, receiving a list of suggestions.

For example, if the crawler discovers a link and sends a request to http://[examplewebsite]?a=1&b=2 then, the probe request will be as follows:

http://[examplewebsite]?a=probe1&b=2
http://[examplewebsite]?a=1&b=probe2

In another example, it can send multiple probes at once, like:

http://[examplewebsite]?a=probe1&b=probe2

A follow-up request can be performed for each of these requests to retrieve the trace from the observer with a list of attack suggestions specifically for the probed parameter. In some examples, the observer 144 can send the responses without a separate request. These suggestions are stored in the scanner's storage and can be used in the audit/attack phase.

When the observer 144 identifies a probe request, it traces the execution path of the probe in the request for potential vulnerabilities to be tested for based on the behavior of the application. This information is returned back to the security test engine 120 through a communication protocol further described in FIG. 2. This information is used by the security test engine 120 to optimize its attacks.

For each probe sent by the trace engine 124, the observer 144 records any vulnerability suggestion based on the behavior of the application. Specifically, the observer 144 observes the Application Programming Interface (APIs) that are exercised by the probe itself. The observer 144 is aware of the probe based on an "AttackString" attribute specified in a "X-Scan-Memo" custom header set by the security test engine 120 as further described in FIG. 2. When the security test engine 120 subsequently sends a trace request, the observer 144 returns the details collected during the original request.

For example, if the probe reaches a SQL query, then the observer 144 returns a suggestion to try SQL Injection on that parameter. Hence, parameters that don't reach SQL queries are excluded from SQL Injection attacks. This can be extended further in the future by looking specifically for SQL queries that are executed without parameterizing the input to the query. Various rules can be implemented on the code to associate one or more vulnerabilities/attack suggestions with the code/a line of code. In this manner, the observer 144 can tell the security test engine 120 whether a vulnerability can exist on the line of code. Examples of such vulnerabilities include SQL Injection, local file inclusion, cross-site scripting, etc. Further, examples of code that can lead to a suggestion can include usage of a known method with a possible vulnerability, usage of a validation approach on such a method that prevents a vulnerability from occurring, which lets the security test engine 120 know that the vulnerability cannot exist, etc. Moreover, vulnerabilities can be server-side vulnerabilities such as SQL Injection, Command Injection. Remote File Inclusion (RFI), Local File Inclusion (LFI), etc. as well as client-side vulnerabilities that can be fixed in server side code such as cross-site scripting, HTTP Response Splitting, etc.

During audit phase, the attack engine 126 will attack sessions and parameters of those sessions based on the suggestions that were returned from the observer 144. In some examples, some of the attacks can be based on the suggestions available based on the suggestion types supported and other attacks not supported can be performed without using the suggestions.

In certain examples, the security test engine 120 can make decisions about attacking the web application in at least 3 different levels—the engine/type of attack to be sent, the request being attacked, and the parameter of the request to be attacked. By curbing unnecessary attacks at each of these levels, the security test engine 120 can avoid spending time on sending futile attacks.

The attack engine 126 can be responsible for executing various audit engines. Each audit engine looks at sessions and attacks all the parameters in the session request. In one example, in an enhanced mode using the suggestions, the auditor executes audit engines that are only relevant to a given session. Also, in one example, the audit engine(s) send attacks only on the parameter(s) that is suspected to be vulnerable. This is derived based on the probe session and information returned from the observer for that specific probe request.

Further, in some examples, the audit engines are responsible for selecting the sessions that the respective audit engines are interested in attacking. The security test engine 120 can have a mechanism to try and avoid attacking duplicate sections of the application. The observer 144 can provide information about the execution path that it was inspecting while sending the suggestion to the security test engine 120. This information can be used to avoid attacking the same server-side logic multiple times, even if the client-side request was different.

The engines, modules, and parts described herein can be distributed between one or more devices. The engines 120, 122, 124, 126 include hardware and/or combinations of hardware and programming to perform functions provided herein. Moreover, modules can include programming functions and/or combinations of programming functions to be executed by hardware as provided herein. When discussing the engines and modules, it is noted that functionality attributed to an engine can also be attributed to a corresponding module and vice versa. Moreover, functionality attributed to a particular module and/or engine may also be implemented using another module and/or engine. Examples of modules and engines include the security test engine 120, crawl engine 122, trace engine 124, attack engine 126, application under test 142, and observer 144.

A processor, such as a central processing unit (CPU) or a microprocessor suitable for retrieval and execution of instructions and/or electronic circuits can be configured to perform the functionality of any of the engines and/or modules described herein. In certain scenarios, instructions and/or other information, such as rules, can be included in memory. Input/output interfaces may additionally be provided by the devices. For example, input devices, such as a keyboard, a sensor, a touch interface, a mouse, a microphone, etc. can be utilized to receive input from an environment surrounding the devices. Further, an output device, such as a display, can be utilized to present information to users. Examples of output devices include speakers, display devices, amplifiers, etc. Moreover, in certain embodiments, some components can be utilized to implement functionality of other components described herein. Input/output devices such as communication devices like network communication devices or wireless devices can also be considered devices capable of using the input/output interfaces.

Each of the engines/modules may include, for example, hardware devices including electronic circuitry for implementing the functionality described herein. In addition or as an alternative, each module may be implemented as a series of instructions encoded on a machine-readable storage medium of computing device and executable by a processor. It should be noted that, in some embodiments, some modules are implemented as hardware devices, while other modules are implemented as executable instructions.

Figure 2:
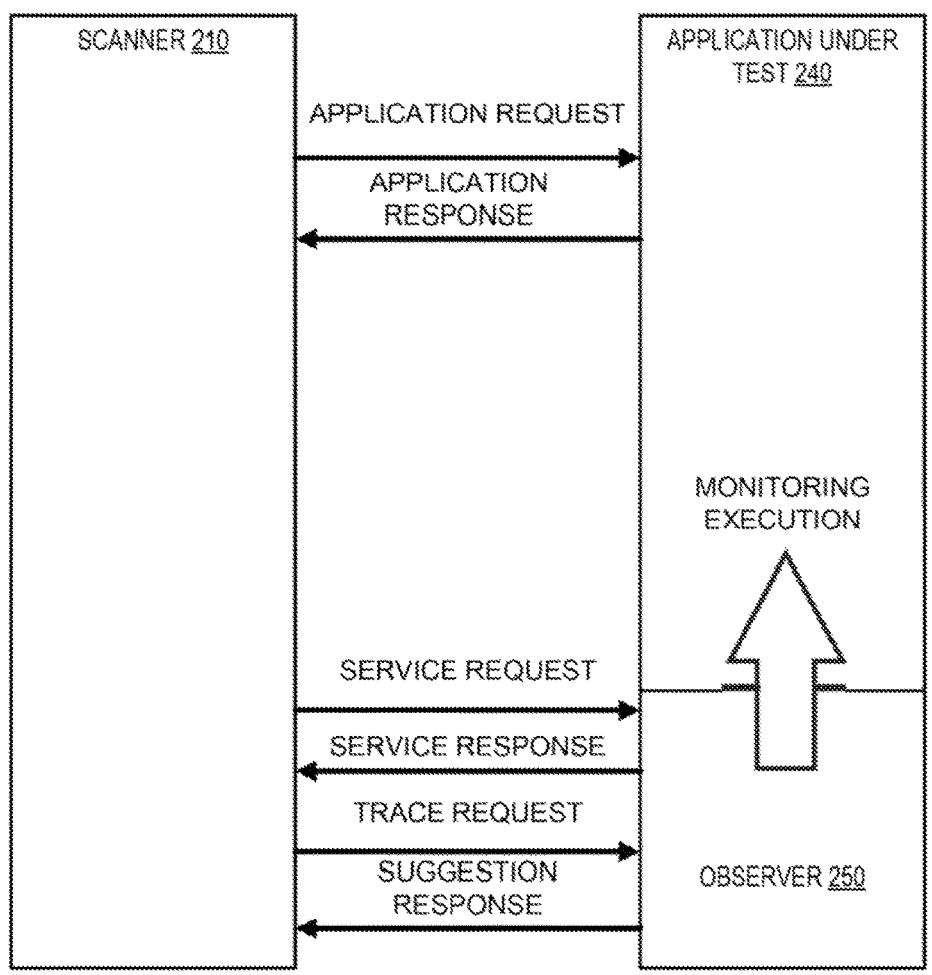
FIG. 2 is a block diagram of a computing system for performing a security test based on attack suggestions, according to one example.

FIG. 2 is a block diagram of a computing system for performing a security test based on attack suggestions, according to one example. The system 200 may include the scanner 210, the AUT 240, and the observer 250. The AUT 240 may be encoded in any suitable Web-based computer language, such as JAVA, or .NET, among others. The AUT 240 may operate within a suitable software framework, such as Struts, Struts 2, ASP.NET MVC, Oracle WebLogic, and Spring MVC, or the like. The software framework includes a set of common code modules that provide generic functionality, which can be selectively overridden or specialized by user code to providing specific functionality. The AUT 240 may be configured to execute one or more instances of a Java Virtual Machine (JVM), Common Language Runtime (CLR), other runtime environment for processing requests from the scanner 210. The programming instructions provided by the common code modules of the software framework or runtime environment may be referred to as container code. Custom programming instructions specific to the AUT 240 may be referred to as user code.

The AUT 124 can include a network interface for enabling communications between the scanner 210 and the AUT 240 through a network. The network interface exposes the attack surface of the AUT 240 and can be the same interface that would eventually be used to provide access to the AUT 240 when the AUT 240 is made available for general use. Communication between the scanner 210 and the AUT 240 over the network interface may be conducted through HTTP requests issued from the scanner 210 to the AUT 240 and HTTP responses issued from the AUT 240 to the scanner 210. Requests targeting the AUT 240 may be referred to as application requests, and responses received from the AUT 240 may be referred to as application responses. The application requests generated by the scanner 210 may be configured to expose potential vulnerabilities of the AUT 240.

The AUT 240 may be coupled to a file system, a database, and other resources used by the AUT 240. The database may include a variety of user information such as a table of usernames and passwords used to grant access to various resources of the AUT 240, for example. The file system may include data and programs used by the AUT 240, as well data which may be requested by a user such as HTTP pages, software programs, media files, and the like.

The observer 250 can operate within the execution environment of the AUT 240 and has access to the internal operations performed by the AUT 240. For example, the observer 250, in certain examples, may modify the bytecode of the AUT 240 by injecting additional code, such as a JAVA class, at various program points. The injected code acts as a monitor that observes the AUT 240. The injected monitor code may be located at strategic program points in the AUT 240, for example, application programming interface (API) calls that perform specific operations such as reading a URL parameter or writing to the file system. Whenever such a program point in the AUT 240 is executed, the monitor calls into services provided by the observer 250 to record operations performed by AUT 240. The observer 250 may be coupled to a buffer for storing information that has been collected regarding the internal operations of the AUT 240. The buffer may be used to store data that has been collected but has not yet been reported to the scanner 210. The buffer may be stored in non-volatile storage medium such as a hard disk, solid state drive, and the like.

The observer 250 may also include an additional network interface for enabling communications between the observer 250 and the scanner 210 through the network. As noted above, both network interfaces may use the same communication channel, for example, the same HTTP channel. Communications between the scanner 210 and the observer 250 may be implemented through the use of custom request and response headers. Custom headers may be added to the application requests by the scanner 210, and custom headers may be added to the application responses by the observer 250. In this way, at least some of the communications between the scanner 210 and the observer 250 may be piggy-backed on normal communications with the AUT 240.

The scanner 210 may add one or more custom headers to each application request, wherein the custom headers include information that the observer 250 may use to diagnose a vulnerability related to an attack in progress. Information within the custom header can include the version of the scanner 210, or the payload that the scanner 210 is using in the attack. The payload information may be used by the observer 250 to determine whether the attack succeeded.

The scanner 210 may also use custom request headers to generate requests that target the observer 250 to obtain additional information regarding the internal processes performed by the AUT 240, or information about AUT 240, the server, or the observer 250. Requests targeting the observer 250 may be referred to as service requests, and responses received from the observer 250 may be referred to as service responses. Service responses issued by the observer 250 may include supplemental information in the body of the service response, as described further below.

In various examples, the observer 250 is configured to receive the application requests and the service requests sent from the scanner 210 to the AUT 240. The observer 250 may then analyze the header information to determine whether the request is an application request or a service request.

Upon receiving an application request, the observer 250 may analyze the header information to acquire data used by the observer 250 regarding the specific application request. Application requests may then be delivered by the observer 250 to AUT 240 for processing by the AUT 240 according to the AUT's programming. When the AUT 240 generates the application response, the observer 250 may add one or more custom headers to the application response to send additional information back to the scanner 210.

In some examples, per-request headers may be custom HTTP headers that include a custom field name followed by one or more field values that are understood by the observer 250 and the scanner 210. In these examples, the custom HTTP headers are ignored by the AUT 240. It will be appreciated that the field names described herein are merely used as examples of field names that could be used in a particular implementation and are not intended to limit the scope of the claims.

As noted above, for probes sent by the scanner 210, the observer 250 records any vulnerability suggestion based on the behavior of the AUT 240. More particularly, the observer 250 can observe the APIs that are exercised by the probe itself. The observer 250 can be aware of the probe based on a per-request header. For example, the per-request header may include a memo header used to coordinate the interaction between the scanner 210 and the observer 250. In some examples, the scanner 210 may add a memo header probe and/or trace request. The observer 250 may use the memo header identify an attack string associated with the probe. As an example, the memo header may be formatted as follows:

X-Scan-Memo: <AttackString>/<OtherInformation>

In response to an application request for a probe/trace, the observer 250 may determine the effect of the application request by determining, for example, particular lines of code that have been executed by the AUT 240, files that have been accessed by the AUT 240, database queries executed by the AUT 240, or other information. The data collected by the observer 250 can be stored to a data structure, referred to herein as a "trace." In embodiments, each trace may be stored in a buffer.

Each trace may include the Request ID of the application request and the application response that corresponds with the trace. The scanner 210 can learn about the internal operations of the AUT 240 that were triggered by a particular application request by retrieving the corresponding trace from the observer 250. To retrieve a trace, the scanner 210 may issue a service request to the observer 250 that includes a header field name/value pair configured to indicate the request of the trace corresponding to a particular application request or response, for example, for particular probes or sets of probes. For example, the field name/value pair for requesting a trace may be formatted as follows:

Trace=<request_id>

The value <request_id> is the value assigned by the scanner 210 or the observer 250 that corresponds with the application request and/or application response associated with the requested trace. Upon receiving the trace service request, the observer 250 may bypass the AUT 240 and generate a service response that includes the requested trace. In certain examples, the requested trace may be retrieved by the observer 250 from the buffer and added to the body of the service response, which may then be sent to the scanner 210. Further, in some examples, the service response header includes the request_id value of the requested trace, and the body of the service response may be formatted as a JSON object.

The observer 250 may maintain a plurality of traces in the buffer so that the scanner 210 can request a trace for any application request that has been made. The buffer may be of any size suitable for a particular implementation. In an example, traces stored to the buffer may be removed from the buffer in a first-in-first-out, first-in-last-out, etc. manner if the buffer becomes full.

The scanner 210 may be configured to send a separate trace service request after the corresponding application request was made and a response received from the AUT 240. The request_id enables the observer 250 to receive trace requests out-of-sequence while still being able to associate the received trace with the appropriate application request and response. Trace requests may be received out-of-sequence due, in part, because the scanner 210 might have multiple threads of execution issuing application requests to the AUT 240.

In some examples, a request ID can be associated with the respective probes. Information collected about the probes can be stored in a database that may be referenced using the request ID. When a trace request arrives for a particular request ID or multiple request IDs, information about the probes (e.g., attack suggestions) can be provided.

The observer 250 may monitor processes performed by the AUT 240 that occur outside the context of an application request, such as processes initiated by the additional monitor code injected by the observer 250. To avoid incurring an unacceptable level of performance overhead, the observer 250 may be configured to minimize the performance overhead of monitoring processes that are unrelated to application requests. For example, the performance overhead may be minimized by injecting the monitor code to selectively monitor specific API calls and relevant portions of the AUT's user code.

As noted above, the requests and responses can be used to perform a scan on the AUT 240 using attack suggestions received from the observer 250. The scanner 210 can send a service request to the observer 250 to request a set of attack suggestions that the observer 250 supports. The supported attack suggestions can be based on a set of rules or configurations that are implemented by the observer. In some examples, the rules/configurations may be used by the observer 250 in a manner such that the code executed by the observer 250 need not be changed. As such, the configuration files/rules can be updated to support additional attack suggestions. The observer 250 can send a service response providing the supported attack suggestions, which is received by the scanner 210.

The scanner 210 can then perform a crawl of the AUT 240 to determine an attack surface using crawl sessions as described above. The scanner 210 can probe one or more parameters of the attack surface during the crawl sessions. During the probing, the scanner 210 can send a trace request to request a trace from the observer 250 of the one or more parameters.

The observer, during the probe, determines the attack suggestions by inspecting the execution path of the AUT 240 during the probe. The inspection can be further based on one or more APIs exercised by the probe. As noted above, the observer 250 can monitor execution of the AUT 240 and can provide information, such as one or more lines of code executed that may be associated with a vulnerability to the scanner 210 via a suggestion response. The trace request and suggestion response can be implemented using a service request and service response. Further, the probe usage can be performed using an application request. Multiple probes can be sent and suggestions can be received by the scanner 210 during the crawling of the AUT 240.

The scanner 210 receives the suggestion response(s) from the observer 250 based on the trace of the parameters. The attack suggestions can include a list of vulnerabilities associated with particular types of functions used during the probe of the one or more parameters. Examples can be functions used to call a framework that may be associated with a particular vulnerability. This can be based on a comparison or usage of a rule with one or more lines of code being executed.

The scanner 210 can then perform an attack on the AUT 240. The attack can be used to determine one or more security vulnerabilities. For parts of the attack surface for which there is an attack suggestion to use, the attack can use the attack suggestions from the observer 250 for portions of the attack that supports the supported attack suggestions. In certain examples, if there is no attack suggestion for a supported attack suggestion type, that type of attack need not be used during the attack.

The observer 250 can monitor the attack as well as probes to determine deduplication information. The observer 250 can determine access to underlying code of the AUT 240 during the probes and/or during an attack. The observer 250 can determine deduplication information based on the underlying code accessed. The deduplication information can include a line of code, for example, a line that calls a function or method such as a method used by a framework. The observer can send the deduplication information to the scanner 210 as a service response.

The scanner 210 can receive the deduplication information. As noted, the deduplication information can include a line of code. The line of code can be added to a hash that is maintained by the scanner for the AUT. The hash can be used to determine whether that underlying code has previously been attacked during the attack phase. As such, the scanner 210 can check against the hash to determine whether a particular line of code that was accessed by a probe/trace has already been attacked to determine whether that line of code is vulnerable (e.g., because the attacks were implemented using another access point and the code portion was observed). As such, code that can be accessed by multiple places in the attack surface need to be attacked in each of the places of the attack surface once results are gained. In some examples, code that is found to have vulnerability is not further attacked. In other examples, code that is not found to have vulnerability may be attacked or not attacked. This can be based on a configuration of the scanner 210. As such, the scanner 210 can use the hash to determine whether to perform at least one attack.

Moreover, in some examples, deduplication information collected during an attack may not be used to halt the attack (e.g., if resources have already been committed before determining that the attack was a duplicate). In these scenarios, the deduplication information can be collected and used at a later time, for example, during verification and processing of the results. In these areas, with the deduplication information, security professionals need not spend time on each vulnerability that is found for the same line of code or issue.

Figure 3:
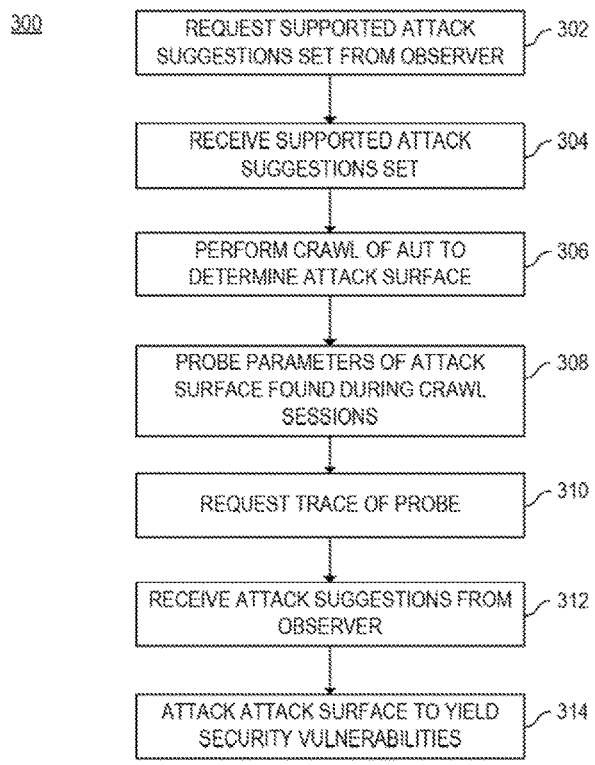
FIG. 3 is a flowchart of a method for performing a security test based on attack suggestions, according to one example.
Figure 4:
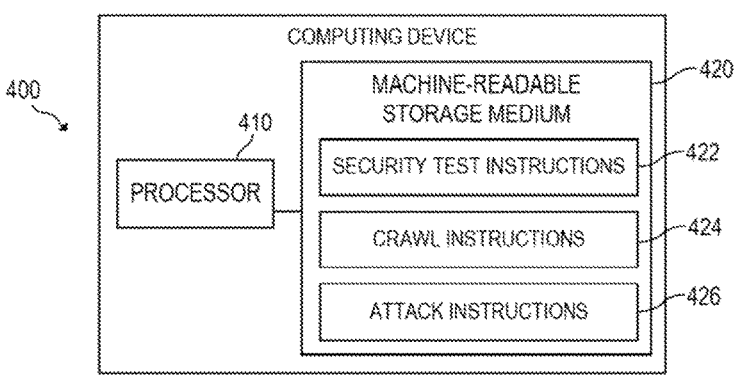
FIG. 4 is a block diagram of a computing device capable of performing a security test based on attack suggestions, according to one example.

FIG. 3 is a flowchart of a method for performing a security test based on attack suggestions, according to one example. FIG. 4 is a block diagram of a computing device capable of performing a security test based on attack suggestions, according to one example. Although execution of method 300 is described below with reference to computing device 400, other suitable components for execution of method 300 can be utilized (e.g., computing systems 100 and/or 200). Additionally, the components for executing the method 300 may be spread among multiple devices. Method 300 may be implemented in the form of executable instructions stored on a machine-readable storage medium, such as storage medium 420, and/or in the form of electronic circuitry.

The computing device 400 includes, for example, a processor 410, and a machine-readable storage medium 420 including instructions 422, 424, 426 for performing a security test on an AUT. Computing device 400 may be, for example, a notebook computer, a desktop computer, a workstation, a server, a slate computing device, a portable reading device, a wireless email device, a mobile phone, or any other computing device capable of performing the functionality described herein.

Processor 410 may be, at least one central processing unit (CPU), at least one semiconductor-based microprocessor, at least one graphics processing unit (GPU), other hardware devices suitable for retrieval and execution of instructions stored in machine-readable storage medium 420, or combinations thereof. For example, the processor 410 may include multiple cores on a chip, include multiple cores across multiple chips, multiple cores across multiple devices (e.g., if the computing device 400 includes multiple node devices), or combinations thereof. Processor 410 may fetch, decode, and execute instructions 422, 424, 426 to implement method 300. As an alternative or in addition to retrieving and executing instructions, processor 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for performing a security test based on attack suggestions.

Security test instructions 422 can be executed to perform a security test on an application under test running on a server. At 302, the computing device 400 can request supported attack suggestions from an observer that the observer supports. The observer can be used to monitor the AUT. At 304, the computing device receives a set of supported attack suggestions from the observer.

At 306, the computing device 400 performs a crawl of the AUT to determine an attack surface using crawl sessions using crawl instructions 424. As noted above, during the crawl sessions, the computing device can probe one or more parameters of the attack surface for the crawl sessions (308). During the probing, the computing device 400 can request a trace from the observer for the probes of the parameters (310). The response to the trace can include attack suggestions that can be used during an attack phase.

The computing device 400 receives the attack suggestions from the observer (312). The attack suggestions can be based on the trace(s) of the one or more parameters. As described herein, the attack suggestions can be determined based on monitoring of the execution path of the underlying code of the AUT by the observer. The monitoring of the execution can further be based on one or more APIs exercised by the probe. One or more rules can correlate the APIs and/or other code with attack suggestions.

At 314, the computing device 400 attacks the attack surface to yield one or more security vulnerabilities using attack instructions 426. The attack can use the attack suggestions from the observer for one or more parts of the attack that supports the supported attack suggestions. During the attack, the computing device 400 can maintain a deduplication hash. The deduplication hash can be based on one or more parts of the code of the AUT. During the attack, the observer can provide information about what underlying code sections have been exercised by the attack. As such, the computing device can receive deduplication information from the observer. In some examples, the deduplication information can include the underlying code sections, which may be based on what is observed during the execution of the AUT. Further, the code sections can include one or more lines of the code itself. The code is received by the computing device to add to the hash.

The deduplication information can then be used to halt a test for a particular section of code of the AUT. The section of code may have already been tested previously. If the attack suggestion being used is for a section of code that has already been exercised, the security test need not attack the same section accessed using another part of the attack surface.

Figure 5:
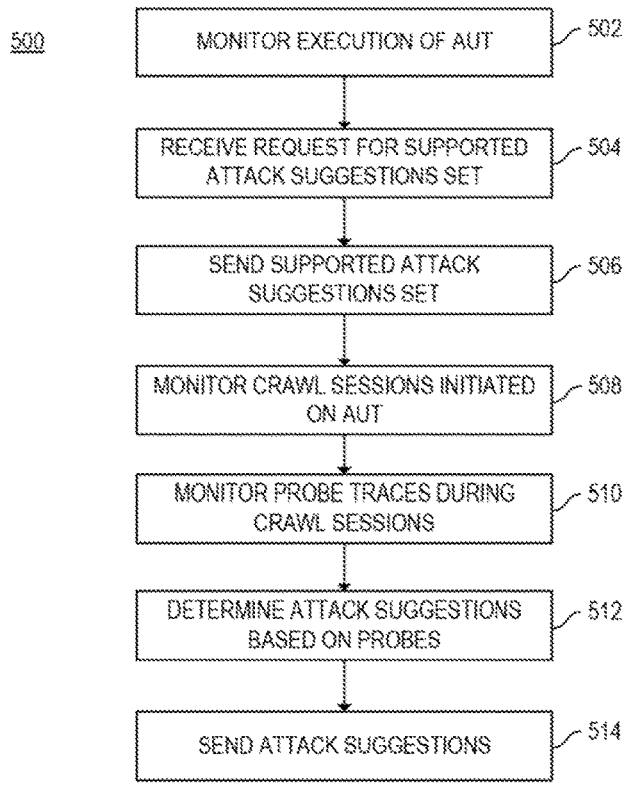
FIG. 5 is a flowchart of a method for providing attack suggestions for a security test, according to one example.
Figure 6:
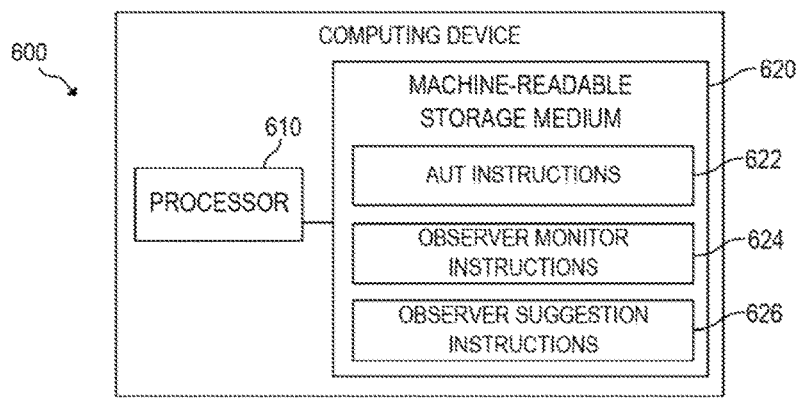
FIG. 6 is a block diagram of a computing device capable of providing attack suggestions for a security test, according to one example.

FIG. 5 is a flowchart of a method for providing attack suggestions for a security test, according to one example. FIG. 6 is a block diagram of a computing device capable of providing attack suggestions for a security test, according to one example. Although execution of method 500 is described below with reference to computing device 600, other suitable components for execution of method 500 can be utilized (e.g., computing systems 100 and/or 200). Additionally, the components for executing the method 500 may be spread among multiple devices. Method 500 may be implemented in the form of executable instructions stored on a machine-readable storage medium, such as storage medium 620, and/or in the form of electronic circuitry.

The computing device 600 includes, for example, a processor 610, and a machine-readable storage medium 620 including instructions 622, 624, 626 for performing a security test on an AUT. Computing device 600 may be, for example, a notebook computer, a desktop computer, a workstation, a server, a slate computing device, a portable reading device, a wireless email device, a mobile phone, or any other computing device capable of performing the functionality described herein.

Processor 610 may be, at least one central processing unit (CPU), at least one semiconductor-based microprocessor, at least one graphics processing unit (GPU), other hardware devices suitable for retrieval and execution of instructions stored in machine-readable storage medium 620, or combinations thereof. For example, the processor 610 may include multiple cores on a chip, include multiple cores across multiple chips, multiple cores across multiple devices (e.g., if the computing device 600 includes multiple node devices), or combinations thereof. Processor 610 may fetch, decode, and execute instructions 622, 624, 626 to implement method 500. As an alternative or in addition to retrieving and executing instructions, processor 610 may include at least one integrated circuit (IC), other control logic, other electronic circuits, or combinations thereof that include a number of electronic components for performing the functionality of instructions 622, 624, 626.

Machine-readable storage medium 620 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 620 may be encoded with a series of executable instructions for performing a security test based on attack suggestions.

The computing device 600 can host an AUT using AUT instructions 622. Further, an observer can be used to monitor the AUT using observer monitor instructions 624 and provide suggestions to attack relevant sections of the AUT instructions 622 using observer suggestion instructions 626. A security test engine such as a scanner can be used to perform a security test on the AUT.

At 502, the observer can monitor execution of the AUT. The scanner can send and at 504, the observer can receive a request for supported attack suggestions from the scanner. The observer can determine a list of supported attack suggestions. The list can be predetermined and stored in a database or can be dynamically determined based on one or more configuration files and/or rules. At 506, the observer sends the set of supported attack suggestions to the security test engine. In some examples, the set of supported attack suggestions can be updated using a configuration file. As such, the code of the observer need not be changed to update what attack suggestions can be used or implemented. In some examples, the configuration file can include rules that can be used to determine one or more vulnerability possibilities and/or information about one or more frameworks used by the AUT.

At 508, the observer monitors crawl sessions initiated by the security test engine on the AUT. During the crawl sessions, the observer can monitor one or more probes of the security test engine on the AUT using one or more parameters as described above (510). The observer can determine attack suggestions for the respective probes based on rules/configurations available to the observer (512). The attack suggestions can be sent to the security test engine at 514.

The attack suggestions can be used to control a penetration test performed by the security test engine. As such, the computing device 600 can receive the penetration test that uses the attack suggestions. The observer can further observe the AUT during the penetration test. As noted above, the observer can determine access to underlying code of the AUT during the penetration test. Further, the observer can determine deduplication information based on the underlying code accessed and send the deduplication information to the security test engine. As noted above, in some examples, the deduplication information can be used to halt an attack based on a suggestion that would duplicate another attack previously performed.

What is claimed is:
1. A system comprising:
a server hosting:
an application under test (AUT); and
an observer to monitor instructions executed by the AUT, wherein the observer is a runtime agent operating in an execution environment of the AUT;
a computing device communicatively coupled to the AUT and the observer through a common communication channel, the computing device to:
perform a crawl of the AUT to determine an attack surface using crawl sessions;

probe one or more parameters of the attack surface during the respective crawl sessions;

request a trace from the observer for the probe of the one or more parameters;

receive attack suggestions from the observer based on the trace of the one or more parameters, the attack suggestions received from the observer including a list of security vulnerabilities of the AUT;

receive deduplication information from the observer, wherein the deduplication information includes a line of code;

add the deduplication information to a hash; and use the hash to determine whether to perform at least one attack on the attack surface.

2. The system of claim 1, wherein the computing device further to:

request from the observer a set of supported attack suggestions that the observer supports; and receive the set of supported attack suggestions.

3. The system of claim 1, wherein the computing device is further to:

attack the attack surface to yield one or more security vulnerabilities, wherein the attack uses the attack suggestions received from the observer.

4. The system of claim 1, wherein the list of vulnerabilities included in the received attack suggestions is associated with particular types of functions used during a probe of a parameter.

5. The system of claim 1, wherein the observer is further to:

determine access to underlying code of the AUT;

determine the deduplication information based on the underlying code accessed; and send the deduplication information to the computing devices.

6. The system of claim 1, wherein the observer, during the trace, determines the attack suggestions by inspecting the execution path of the AUT during the probe and wherein the inspection is further based on one or more application programming interfaces (APIs) exercised by the probe.

7. A non-transitory machine-readable storage medium storing instructions that, upon execution by at least one processor of a device, cause the device to:

perform a crawl of an application under test (AUT) executed on a second device, the crawl to determine an attack surface using a plurality of crawl sessions;

probe one or more parameters of the attack surface;

request a trace from an observer for the respective probes of the one or more parameters, wherein the observer is a runtime agent executed on the second device;

receive attack suggestions from the observer based on the trace of the one or more parameters, the received attack suggestions including a list of security vulnerabilities of the AUT;

receive deduplication information from the observer, wherein the deduplication information includes a line of code;

add the deduplication information to a hash; and use the hash to determine whether to attack the attack surface using the received attack suggestions.

8. The non-transitory machine-readable storage medium of claim 7, wherein the attack suggestions are determined by the observer based on monitoring of the execution path of the underlying code of the AUT.

9. The non-transitory machine-readable storage medium of claim 8, wherein the monitoring of the execution of the underlying code of the AUT by the observer is further based on one or more application programming interfaces (APIs) exercised by the probe.

10. The non-transitory machine-readable storage medium of claim 7, further comprising instructions that, if executed by the at least one processor, cause the device to:

receive the deduplication information from the observer during an attack; and use the deduplication information to halt a test of a particular section of code of the AUT.

11. A non-transitory machine-readable storage medium storing instructions that, upon execution by at least one processor of a device, cause the device to:

monitor, using an observer, execution of an application under test (AUT), wherein the observer is a runtime agent operating in an execution environment of the AUT;

monitor, using the observer, a crawl session of the AUT performed by a security test engine on a second device;

perform a path trace, using the observer, of a probe by the security test engine on the AUT during the crawl session using one or more parameters;

determine, using the observer, attack suggestions based on the path trace of the probe;

send the attack suggestions from the observer to the security test engine, the attack suggestions received including a list of security vulnerabilities of the AUT;

determine, using the observer, deduplication information based on the underlying code accessed; and send the deduplication information from the observer to the security test engine, wherein the deduplication information includes a line of code, wherein the security test engine is to add the deduplication information to a hash and use the hash to determine whether to perform at least one attack using the attack suggestions.

12. The non-transitory machine-readable storage medium of claim 11, further comprising instructions that upon execution by the at least one processor, cause the device to:

receive, using the observer, a penetration test that uses at least one of the attack suggestions;

monitor, using the observer, the AUT during the penetration test.

13. The non-transitory machine-readable storage medium of claim 11, wherein the set of support attack suggestions is updated using a configuration file.

14. The non-transitory machine-readable storage medium of claim 11, further comprising instructions that, upon execution by the at least one processor, cause the device to: receive, using the observer, a request for supported attack suggestions from a security test engine; send a set of supported attack suggestions from observer to the security test engine.

15. The non-transitory machine-readable storage medium of claim 11, wherein the list of vulnerabilities included in the attack suggestions is associated with particular types of functions used during the probe on the AUT.

16. The non-transitory machine-readable storage medium of claim 7, further comprising instructions that, if executed by the at least one processor, cause the device to:

request, from the observer, a set of attack suggestions that the observer supports; and receive the set of supported attack suggestions from the observer.

17. The non-transitory machine-readable storage medium of claim 7, wherein the list of vulnerabilities included in the attack suggestions is associated with particular types of functions used during the probe on the AUT.

18. The non-transitory machine-readable storage medium of claim 7, wherein the observer is executed in an execution environment of the AUT.

\* \* \* \* \*